UNITED STATES PATENT OFFICE.

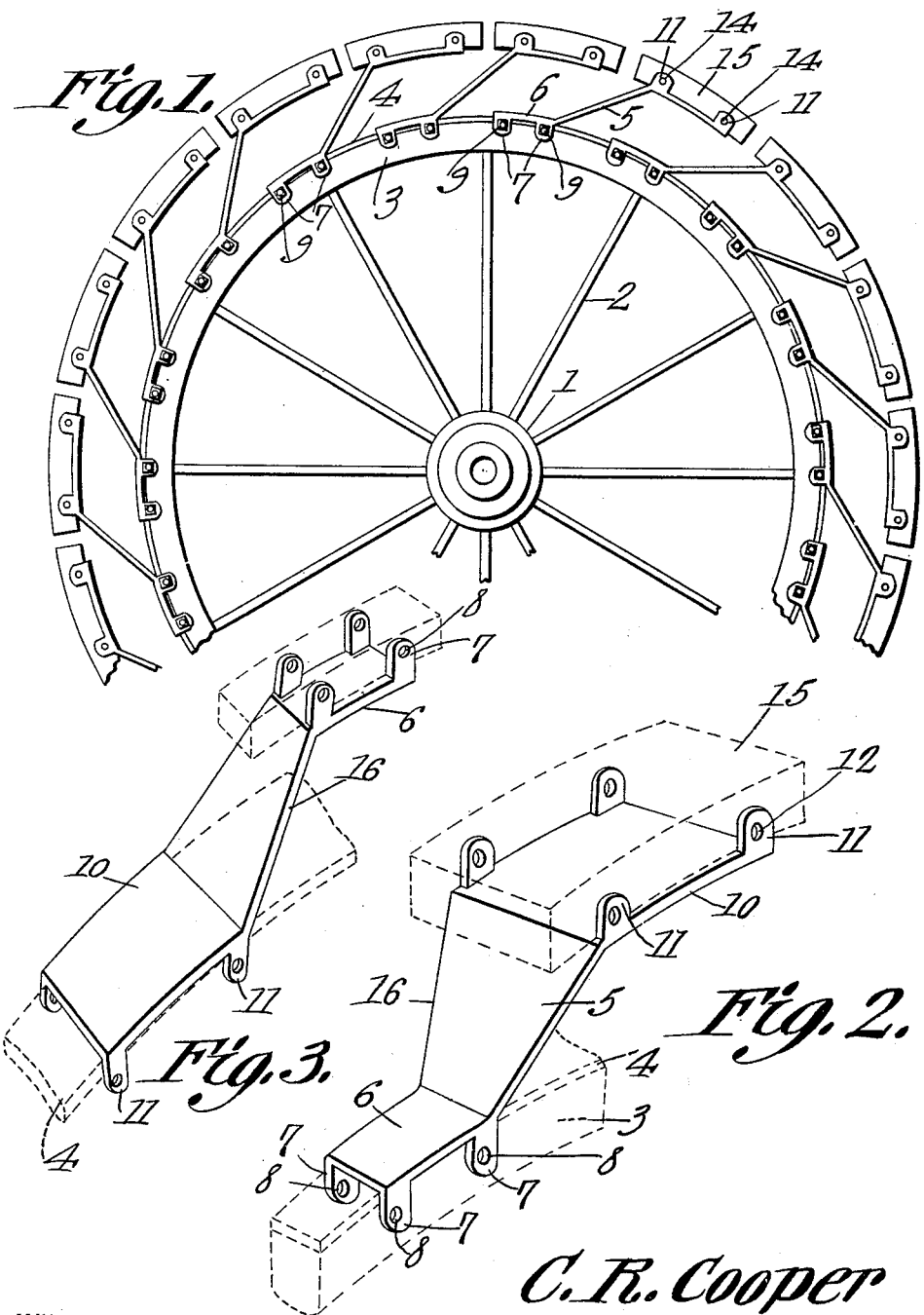

CLARENCE R. COOPER, OF FORT DODGE, IOWA.

AUTOMOBILE-TIRE.

1,117,977. Specification of Letters Patent. Patented Nov. 24, 1914.

Application filed April 22, 1914. Serial No. 833,706.

*To all whom it may concern:*

Be it known that I, CLARENCE R. COOPER, a citizen of the United States, residing at Fort Dodge, in the county of Webster and State of Iowa, have invented a new and useful Automobile-Tire, of which the following is a specification.

The device forming the subject matter of this application is a resilient vehicle tire, and one object of the present invention is to provide a structure of this type in which pneumatic tires and other elements of a like character and subject to puncture are dispensed with.

Another object of the invention is to provide novel means whereby a plurality of spring arms may be connected with the tread portion of the tire and with the rim of the wheel.

It is within the scope of the invention to improve generally and to enhance the utility of devices of that type to which the present invention appertains.

With the above and other objects in view which will appear as the description proceeds, the invention resides in the combination and arrangement of parts and in the details of construction hereinafter described and claimed it being understood that changes in the precise embodiment of the invention herein disclosed can be made within the scope of what is claimed without departing from the spirit of the invention.

In the accompanying drawing:—Figure 1 shows in side elevation, a portion of a wheel equipped with the tire constituting the subject matter of this application; Fig. 2 is a perspective view illustrating one of the spring arms, attendant elements being shown in dotted lines. Fig. 3 is a perspective detail illustrating the spring arm 5 reversed from the position shown in Fig. 2.

In the accompanying drawing the numeral 1 indicates the hub of a wheel from which radiate spokes 2 carrying a rim which is a composite structure, the rim comprising a felly 3 and a felly band 4, the latter preferably being made of metal.

The invention includes a spring arm 5 in the form of a plate, the spring arm being disposed at an acute angle to the radius of the rim. At its inner end, the spring arm 5 is provided with a resilient primary table 6 which rests upon the outer circumference of the felly band 4, the primary table 6 being equipped with flanges 7 lying upon opposite sides of the felly band 4 and the felly 3 and engaging these elements. The flanges 7 may be in the form of ears, disposed in pairs, the members of the respective pairs being positioned opposite to each other. In the flanges 7 are openings 8 for receiving securing elements 9 which pass through some portion of the rim, preferably through the felly 3. Each spring arm 5 at its outer end is equipped with a resilient secondary table 10 having outstanding flanges or ears 11 provided with openings 12. Resting upon each secondary table 10 is a cushion which may be in the form of a block 15, the cushion or block 15 lying between the ears or flanges 11. In the openings 12 of the ears 11 are held securing elements 14 which pass through the blocks 15.

The spring arm 5 preferably tapers from one end toward the other, as shown at 16. In the present instance, the tread, comprising the blocks 15 is shown as being slightly wider than the rim. Under such circumstances, the spring arm 5 widens from its inner end toward its outer end, but the direction of the taper in the spring arm will depend upon whether or not the tread is wider than the rim. Owing to the fact that a plurality of separate blocks or cushions 15 will be provided, there will be no creasing, bending and breaking of the tread, as the spring arms 5 yield successively under the superposed weight.

The specific means employed for securing the tables, respectively to the tread and to the rim renders the device practically incapable of yielding in a lateral direction although the arms 5 will yield readily parallel to the median plane of the wheel.

Each of the spring arms 5 is reversible that is, if desired, the table 10 may be placed on the rim and the table 6 may be employed for holding the block 15. Thus, a relatively wide tread may be attached to a narrower rim, or a comparatively narrow tread may be assembled with a wider rim. Further, owing to the reversibility of each of the spring arms 5, and recalling that each arm tapers as shown at 16, the narrowest and most resilient portion of the arm, at the will of the operator, may be disposed adjacent the rim or adjacent the tread.

Having thus described the invention, what is claimed is:—

As an article of manufacture, a spring adapted to be used upon a vehicle wheel, and comprising an intermediate spring arm, the arm being provided at its ends with tables which project in opposite directions and are provided along their longitudinal edges with flanges disposed substantially at right angles to the respective tables, the tables being of different widths and the spring being reversible to permit either table to become a rim engaging table and to permit either table to become a tread engaging table, thereby rendering the spring efficient for use in connection with rims and treads of different relative widths.

In testimony that I claim the foregoing as my own, I have hereto affixed my signature in the presence of two witnesses.

CLARENCE R. COOPER.

Witnesses:
F. C. MINOGUE,
C. N. MAILANDER.